United States Patent [19]

Shinkai et al.

[11] 4,454,767

[45] Jun. 19, 1984

[54] ULTRASONIC METERING DEVICE

[75] Inventors: Kazuteru Shinkai; Masaru Kohno; Yukio Nakagawa, all of Kanagawa; Norimasa Tamaoki; Kiyoshi Saito, both of Tokyo, all of Japan

[73] Assignee: Fuji Electric Co., Ltd., Kanagawa, Japan

[21] Appl. No.: 246,768

[22] Filed: Mar. 23, 1981

[30] Foreign Application Priority Data

| Mar. 25, 1980 | [JP] | Japan | 55-37842 |
| Mar. 25, 1980 | [JP] | Japan | 55-37843 |
| Mar. 25, 1980 | [JP] | Japan | 55-37907 |
| Mar. 25, 1980 | [JP] | Japan | 55-37908 |

[51] Int. Cl.³ ............................................. G01F 1/66
[52] U.S. Cl. ............................. 73/861.18; 73/861.28
[58] Field of Search ........... 73/861.18, 861.27, 861.28, 73/597, 644; 310/334, 335, 348, 354

[56] References Cited

U.S. PATENT DOCUMENTS

| 1,596,944 | 8/1926 | Philbrook | 138/99 X |
| 3,280,846 | 10/1966 | Anderson et al. | 138/99 |
| 3,869,915 | 3/1975 | Baumoel | 73/861.28 |
| 3,987,674 | 10/1976 | Baumoel | 73/861.28 |
| 4,019,373 | 4/1977 | Freeman et al. | 73/644 |
| 4,182,155 | 1/1980 | Fowler | 73/644 X |
| 4,286,470 | 9/1981 | Lynnworth | 73/861.18 |

FOREIGN PATENT DOCUMENTS 953167 3/1964 United Kingdom .................. 73/644

Primary Examiner—Charles A. Ruehl
Attorney, Agent, or Firm—Sughrue, Mion, Zinn, Macpeak, and Seas

[57] ABSTRACT

An ultrasonic metering device having two ultrasonic transducers, each having an ultrasonic conversion element and a wedge for holding the conversion element, mounted on a pair of mounting members which are adapted to be mounted on a pipe in which a fluid to be measured flows. The mounting members clamp the pipe with first end portions of the mounting members being hingedly coupled to each other. Tightening means is provided for coupling opposite free end portions of the mounting members which have clamped the pipe to thereby fixedly secure the mounting members to the pipe.

23 Claims, 34 Drawing Figures

ULTRASONIC METERING DEVICE

BACKGROUND OF THE INVENTION

The present invention relates to an ultrasonic metering device with externally located ultrasonic transmitter-receivers. This device is structured so that it can be mounted on a pipe in which a fluid to be measured flows without altering the pipe and can be installed with a high accuracy.

Examples of an ultrasonic metering device of this general type are a flow meter, a densitometer and a current meter.

In mounting the ultrasonic metering device on a pipe, the following requirements should be satisfied:

(1) It is essential that the ultrasonic transmitter-receivers (hereinafter referred to as "ultrasonic transducers" when applicable) be correctly positioned relative to the pipe and relative to each other because the incident angle of the ultrasonic waves with respect to the fluid and the distance between the ultrasonic transducers greatly affect the accuracy of measurement.

(2) It is necessary that the ultrasonic transducers be sufficiently acoustically coupled to the pipe. Excellent sensitivity and accuracy cannot be obtained without satisfying this requirement.

(3) It is desirable that the ultrasonic transducers can be readily mounted on the pipe within a short period of time. One of the merits of the external mounting system resides in that the ultrasonic metering device can be freely mounted on pipes already installed in a plant.

Depending on the fluid carried by the pipe, the area around the pipe may not be suitable for the physical presence of workers such as due to the pipe being at high temperature, filled with poisonous gas or radioactive material. Thus, it is often required that the device can be readily and quickly mounted on a pipe even by unskilled persons without a need for adjustment.

However, no ultrasonic metering device satisfying all these requirements has yet been proposed in the art.

SUMMARY OF THE INVENTION

Accordingly, an object of the invention is to provide an ultrasonic metering device which satisfies all of the above-described requirements and can be accurately mounted on a pipe even by an unskilled person within a short period of time.

The foregoing object and other objects of the invention have been achieved by the provision of an ultrasonic metering device in which the ultrasonic transducers which have been assembled according to the diameter of a given pipe are readily secured to a pipe at a working site.

More specifically, the foregoing and other objects of the invention are met by an ultrasonic metering device in which two ultrasonic transducers are arranged on either side of a pipe in which a fluid flows in such a manner that one of the ultrasonic transducers transmits ultrasonic waves towards and through the fluid while the transducer receives ultrasonic waves which have passed through the fluid. A first ultrasonic transducer having a first ultrasonic conversion element and a first wedge holding the first ultrasonic conversion element are provided. A second ultrasonic transducer is provided having a second ultrasonic conversion element and a second wedge holding the second ultrasonic conversion element. The first and second elements are mounted on a pair of mounting members with the mounting members being adapted to be mounted on a pipe in which a fluid to be measured flows in such a manner that the mounting members clamp the pipe with first end portions of the mounting members hingedly coupled to each other. Tightening means is provided for coupling opposite free end portions of the mounting members which have clamped the pipe to fixedly secure the mounting members to the pipe.

Preferably, the first and second ultrasonic transducers are provided on the pair of mounting members and the inner walls of the pair of mounting members have contact surfaces which, in a section perpendicular to the axis of the pipe, are symmetrical with respect to a plane including an ultrasonic propagation path and are in point contact with the outer wall of the pipe so that the central axes of the first and second ultrasonic transducers are perpendicular to the wall surface of the pipe and the ultrasonic propagation path passes through the center of the pipe. The central axes of the first and second transducers are then coincident with each other to cause the ultrasonic propagation path to lie on a single line passing through the center of the pipe.

The nature, principle and utility of the invention will become more apparent from the following detailed description and the appended claims when read in conjunction with the accompanying drawings.

DESCRIPTION OF THE PREFERRED EMBODIMENTS

Figures 1, 2, 3:
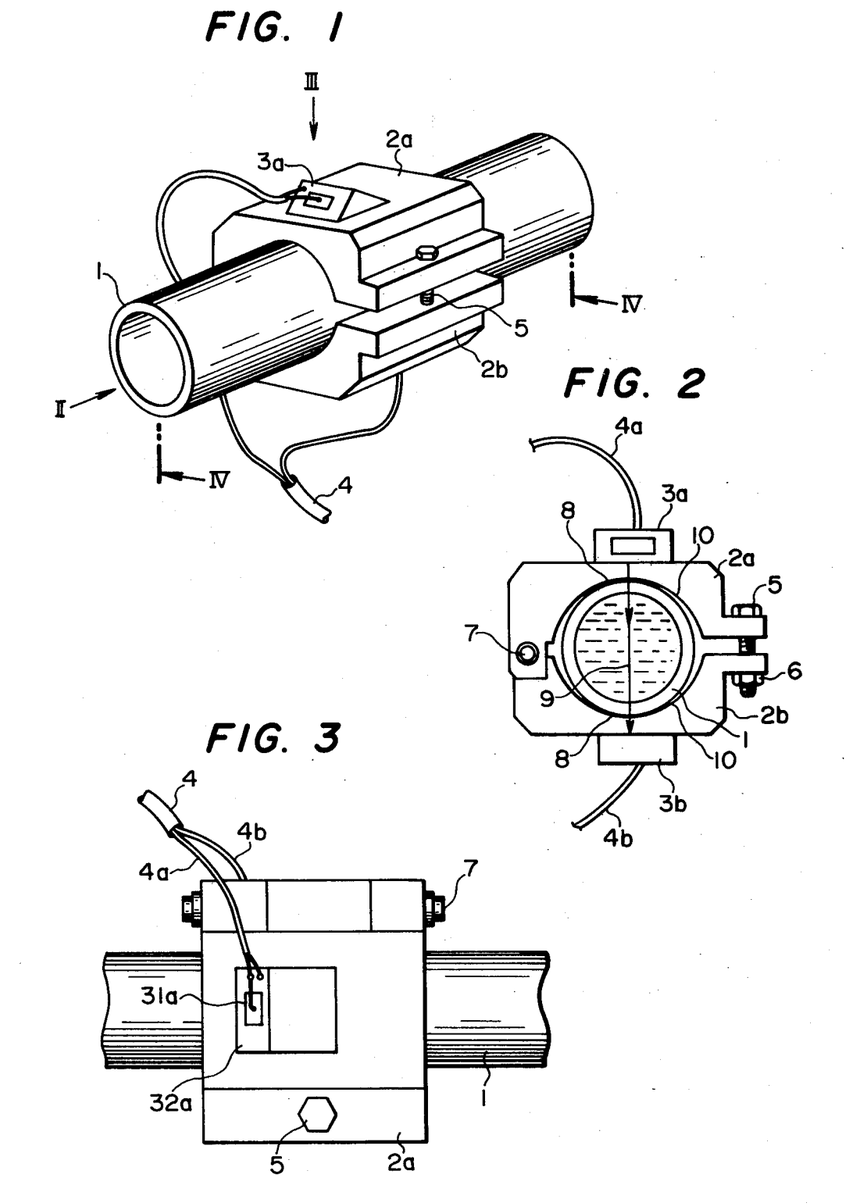
FIG. 1 is a perspective view of a first preferred embodiment of an ultrasonic metering device constructed according to this invention.
FIG. 2 is an end view of the device as viewed in the direction of an arrow II in FIG. 1.
FIG. 3 is a plan view of the device as viewed in the direction of an arrow III in FIG. 1.
Figure 4:
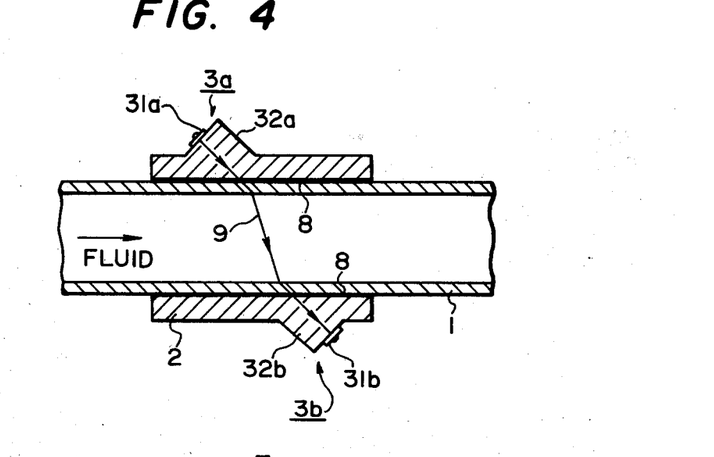
FIG. 4 is a sectional view taken along a line IV—IV in FIG. 1.
Figure 5:
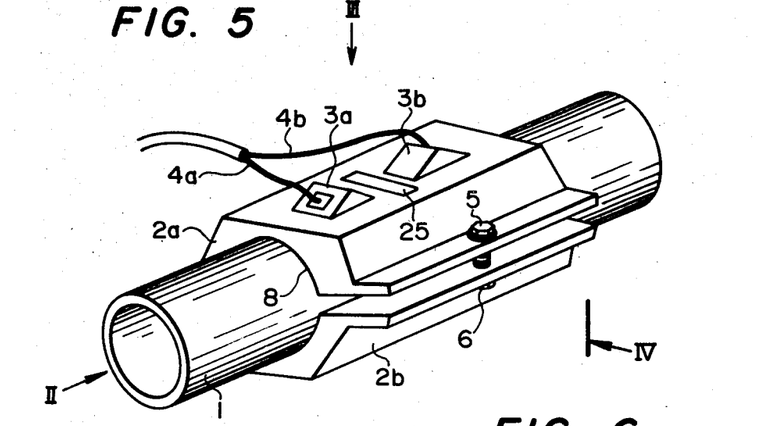
FIG. 5 is a perspective view of a preferred embodiment of a device according to the invention.

A first preferred embodiment of an ultrasonic metering device according to the invention which is applied to the measurement of a flow rate, as shown in FIGS. 1 through 4, includes a pair of mounting members $2a$ and $2b$ for mounting an ultrasonic transmitter (or an ultrasonic transducer) $3a$ and an ultrasonic receiver (or an ultrasonic transducer) $3b$ on opposite sides of a pipe 1 in which a fluid to be measured flows. One end portion of the mounting member $2a$ is hinged to one end portion of the other mounting member $2b$ with a pin 7. The mounting members $2a$ and $2b$ are mounted on the pipe 1 in a clamping arrangement around the pipe 1. Once the mounting members are mounted on the pipe, the other end portions of the mounting members $2a$ and $2b$ are tightened with a tightening bolt 5 and a tightening nut 6 so that the mounting members are fixedly secured to the pipe 1. The transmitter $3a$ and the receiver $3b$ are provided on the mounting members $2a$ and $2b$, respectively. An ultrasonic pulse from the transmitter $3a$ propagates through the fluid in the pipe 1 to the receiver $3b$. The propagation path is along the diameter of the pipe 1 in a plane perpendicular to the axis of the pipe 1, as shown in FIG. 2, and which slants with respect to the axis of the pipe in the longitudinal section of the pipe as shown in FIG. 4.

The transmitter $3a$, as shown in FIGS. 3 and 4, includes a conversion element $31a$ for converting an electrical pulse signal applied thereto through a signal cable into an ultrasonic pulse signal and a wedge $32a$ for propagating the ultrasonic pulse signal obliquely into the fluid in the pipe 1. Similarly, the receiver $3b$ includes a wedge $32b$ and a conversion element $31b$ for converting the ultrasonic pulse signal applied thereto into an electrical pulse signal. The output electrical signal of the conversion element $31b$ is applied to a signal cable $4b$.

The ultrasonic signal is propagated slantingly in the fluid. If it were to be propagated perpendicularly to the direction of the fluid flow, it would be impossible to detect the flow rate of the fluid.

The portions of the mounting members $2a$ and $2b$ which are in contact with the pipe 1 serve as parts of the ultrasonic pulse path. Accordingly, grease, epoxy adhesive or metal foil, which are usually employed for improving the acoustic coupling of the mounting members and the pipe, is applied to the portions of the mounting members $2a$ and $2b$.

The contact surface 10 of each of the mounting members $2a$ and $2b$ is an arcuate surface having a diameter equal to or slightly larger than the diameter of the pipe 1, as described below in more detail.

A second preferred embodiment of an ultrasonic metering device of the invention which is applied to the measurement of a flow rate is shown in FIGS. 5 through 8 in which those components which have been previously described with reference to FIGS. 1 through 4 are similarly numbered.

Figure 6:
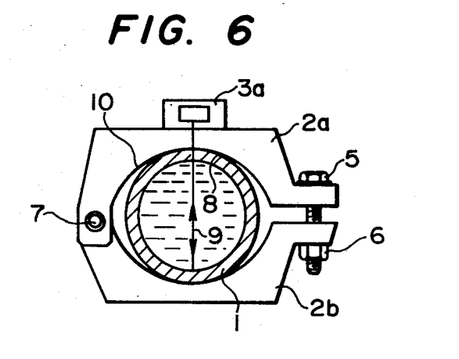
FIG. 6 is an end view of the device as viewed in the direction of an arrow II in FIG. 5.
Figure 7:
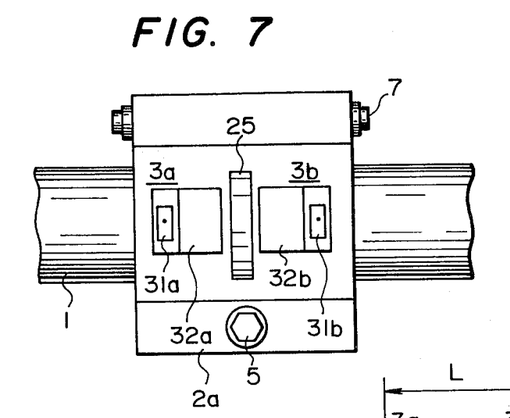
FIG. 7 is a plan view of the device as viewed in the direction of an arrow III in FIG. 5.
Figure 8:
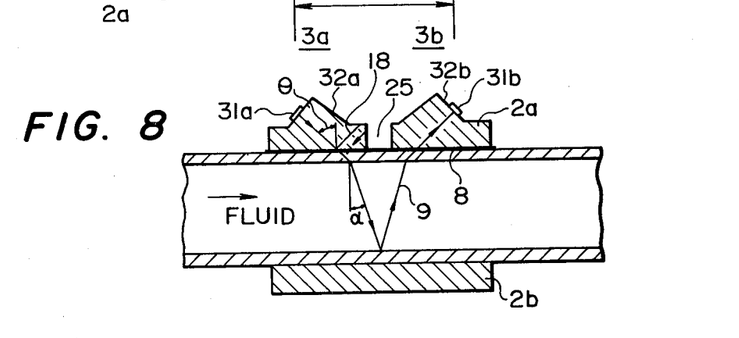
FIG. 8 is a sectional view taken along a line IV—IV in FIG. 5.
Figure 9:
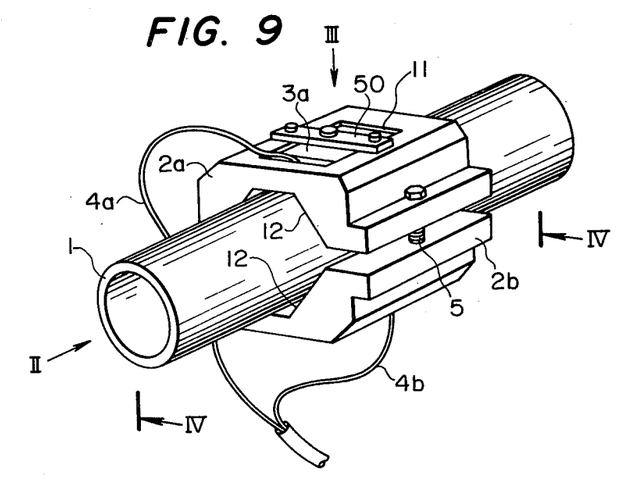
FIG. 9 is a perspective view of a third preferred embodiment of a device according to the invention.
Figure 10:
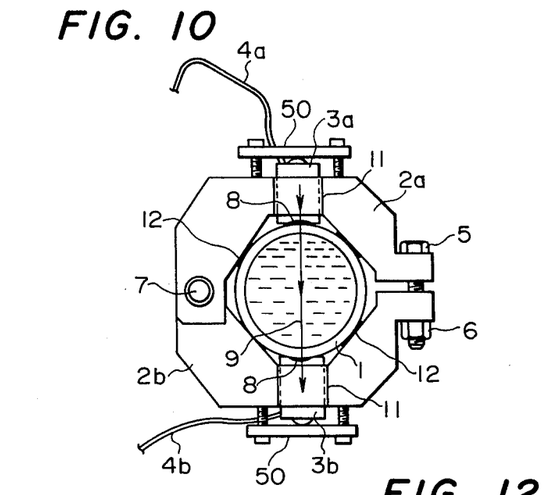
FIG. 10 is an end view of the device as viewed in the direction of an arrow II in FIG. 9.

In the second embodiment, both the ultrasonic transmitter $3a$ and the ultrasonic receiver $3b$ are arranged on the mounting member $2a$. The output ultrasonic pulse signal of the transmitter $3a$ is propagated through the fluid in the pipe 1 and is then reflected by the inner wall of the pipe 1. The ultrasonic pulse signal thus reflected is further propagated to the receiver $3b$. The propagation path 9 is along the diameter of the pipe in a plane perpendicular to the axis of the pipe 1 as shown in FIG. 6 and is oblique to the axis of the pipe 1 in the longitudinal section of the pipe 1 as shown in FIG. 8.

A third preferred embodiment of an ultrasonic metering device of the invention which is applied to the metering device of the invention which is applied to the measurement of a flow rate is shown in FIGS. 9 through 12 in which those components which have been previously described with reference to the first and second embodiments of the ultrasonic metering device are accordingly similarly numbered.

The third embodiment is a modification of the first embodiment. The inner walls of the mounting members $2a$ and $2b$ which are in contact with the pipe 1 are positioning flat surfaces 12. Positioning the mounting members $2a$ and $2b$ on the pipe 1 is carried out by the positioning flat surfaces 12. The ultrasonic transmitter $3a$ and the ultrasonic receiver $3b$ are inserted into throughholes 11 which are formed in the mounting members $2a$ and $2b$ at opposed positions. The transmitter and the receiver thus inserted are depressed against the pipe 1 by depressing members 50. The transmitter $3a$ and the receiver $3b$ are acoustically coupled to the pipe 1 by an acoustic coupling medium 8 such as grease, epoxy adhesive or metal foil interposed between the pipe and the transmitter and the receiver.

A fourth preferred embodiment of an ultrasonic metering device of the invention applied to the measurement of a flow rate is shown in FIGS. 13 through 16 in which those components which have been described with reference to the figures showing the first through third embodiments are therefore similarly numbered.

The fourth embodiment is a modification of the second embodiment. The fourth embodiment is a reflection type ultrasonic metering device.

Positioning the mounting members 2a and 2b on the pipe 1 is achieved by the positioning flat surfaces 12 which are formed in the inner walls of the mounting members 2a and 2b which are brought into contact with the pipe 1. The transmitter 3a and the receiver 3b are inserted into throughholes 11a and 11b, respectively, which are formed in one (2a) of the mounting members. The transmitter and the receiver thus inserted are depressed against the pipe 1 by depressing members 50a and 50b, respectively. The transmitter 3a and the receiver are acoustically coupled to the pipe 1 by an acoustic coupling medium 8 such as grease, epoxy adhesive or a metal foil interposed therebetween.

Figures 13, 14, 15:
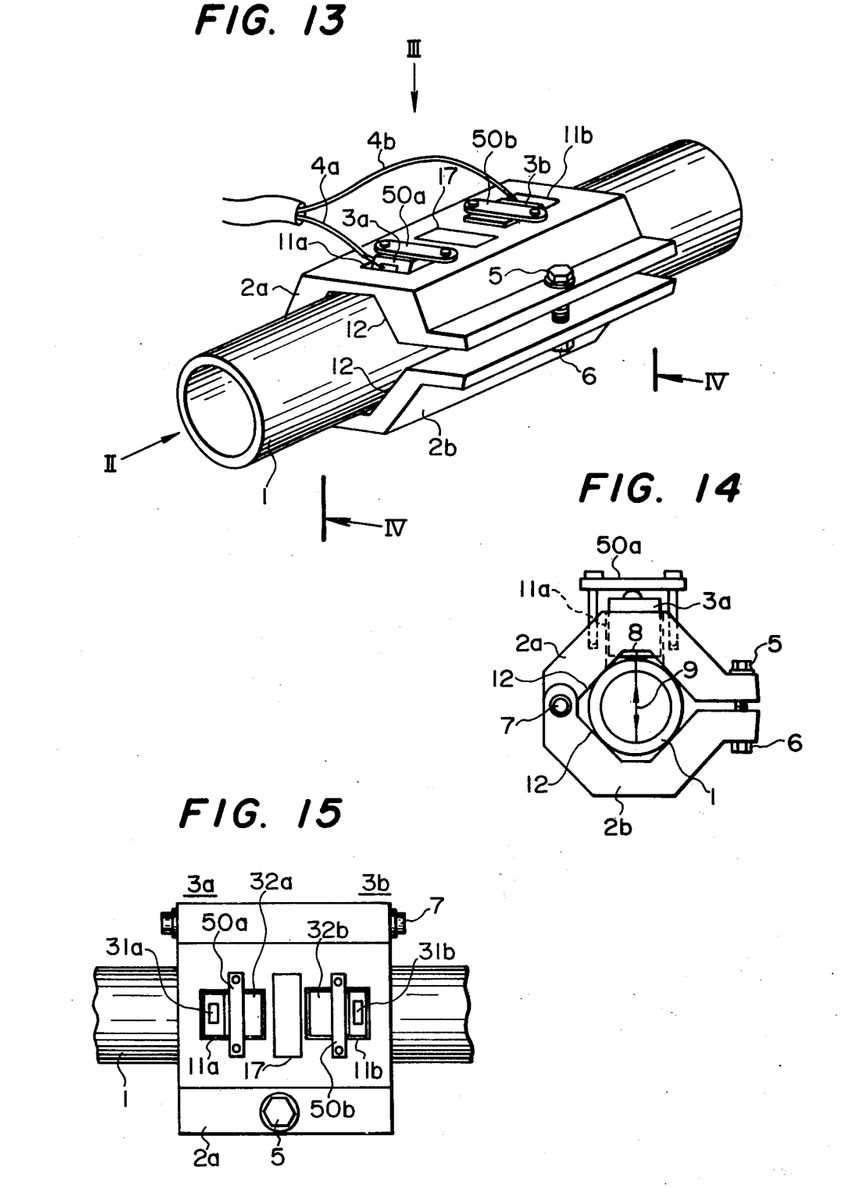
FIG 13 is a perspective view of a fourth preferred embodiment of a device according to the invention.
FIG. 14 is an end view of the device as viewed in the direction of an arrow II in FIG. 13.
FIG. 15 is a plan view of the device as viewed in the direction of an arrow III in FIG. 13.
Figure 16:
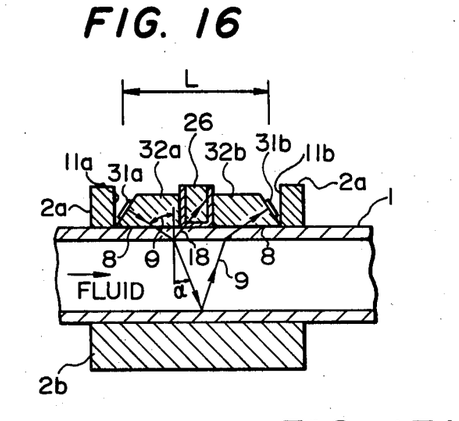
FIG. 16 is a sectional view taken along a line IV—IV in FIG. 13.

Ultrasonic waves are applied along the diameter of the pipe 1 in a plane perpendicular to the axis of the pipe as shown in FIG. 14, and obliquely in the longitudinal section of the pipe to form an angle $\theta$ with the axis of the pipe as shown in FIG. 16. The ultrasonic wave thus applied is refracted at a refraction angle $\alpha$ in the fluid. Thus, the propagation path 9 of the ultrasonic wave is slanting with respect to the axis of the pipe.

In each of the above-described embodiments, it is important that, in order to maintain the predetermined ultrasonic propagation path 9 constant, the relative positions of the transmitter 3a and the receiver 3b, i.e. the relative distance and direction thereof must be positioned properly. The flow rate measurement accuracy depends greatly on the mounting accuracy of the transmitter and the receiver.

In the first and second embodiments, the relative distance between the transmitter and the receiver 3a and 3b in the axial direction of the pipe can be readily set because the two mounting members 2a and 2b are hinged. With respect to the relative direction of the transmitter 3a and the receiver 3b in the cross section of the pipe, after the mounting members 2a and 2b are mounted on the pipe 1, the transmitter 3a and the receiver 3b face forwards so that the ultrasonic propagation path coincides with a straight line passing through the center of the pipe, i.e. the diameter of the pipe, and the contact surfaces 10 of the mounting members 2a and 2b in the first embodiment (the contact surface of the mounting member 2a only in the second embodiment) must be in contact with the pipe 1 in such a manner that they are set precisely on the ultrasonic propagation path. For this purpose, it is necessary to suitably design the dimensions and configuration of each of the contact surfaces 10 which are formed in the inner walls of the two mounting members 2a and 2b (at least the mounting member 2a). The principles of choosing the dimensions and configuration will be described with reference to FIG. 17.

Figure 17A:
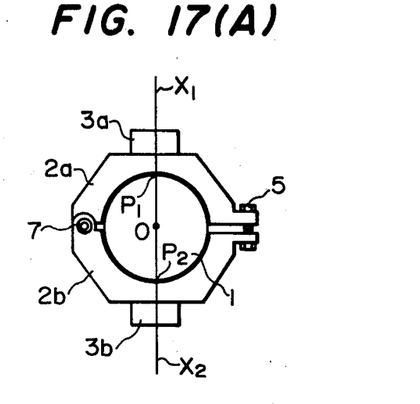
FIGS. 17(A) and 17(B) are an explanatory diagrams for a description of the principle of positioning ultrasonic transducers utilized with the invention.

In FIG. 17(A), the radius of curvature of the contact surfaces 10 is substantially equal to the radius of the pipe 1 and the acoustic coupling media 8 are provided on the contact points $P_1$ and $P_2$ on the ultrasonic propagation path 9 in the first embodiment and the contact point $P_1$ in the second embodiment. In this case, the positions of the transmitter 3a and the receiver 3b on the mounting members 2a and 2b should be such that the ultrasonic propagation path center lines $X_1$ and $X_2$ of the transmitter 3a and the receiver 3b pass through the center O of the pipe and form a single straight line.

Figure 17B:
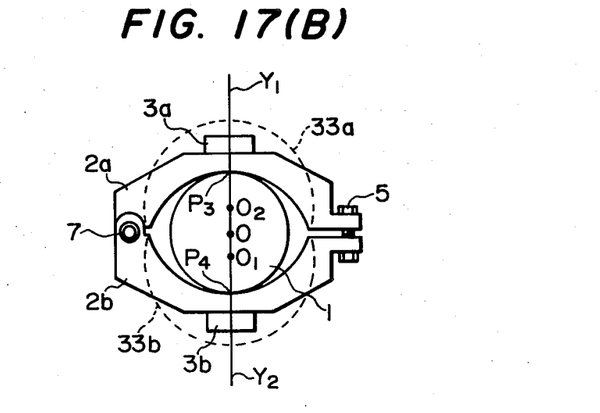

Alternatively, the contact surfaces may be designed as shown in FIG. 17(B). In this case, the radius of curvature of each of the contact surfaces 10 is larger than the radius of the pipe 1 and the contact surfaces 10 are in contact with the pipe 1 at the contact points $P_3$ and $P_4$ on the propagation path. In this connection, in order that the ultrasonic propagation path center lines $Y_1$ and $Y_2$ of the transmitter 3a and the receiver 3b pass through the center O of the pipe 1 and from a single straight line and the contact points $P_3$ and $P_4$ fall in the straight line, it is necessary that the circle centers $O_1$ and $O_1$ of the two cylinders forming the contact surfaces 10 be on the straight line and the distance between the two mounting members 2a and 2b along the straight line be set to a value corresponding to the diameter of the pipe.

As is apparent from the above description, the relative positions of the transmitter 3a and the receiver 3b can be set when the metering device is manufactured. Accordingly, the invention is advantageous in that the metering device can be readily mounted on a pipe at a working site merely by tightening the tightening bolt 5 and nut 6. That is, the ultrasonic metering device mounting operation can be readily achieved.

Figure 18:
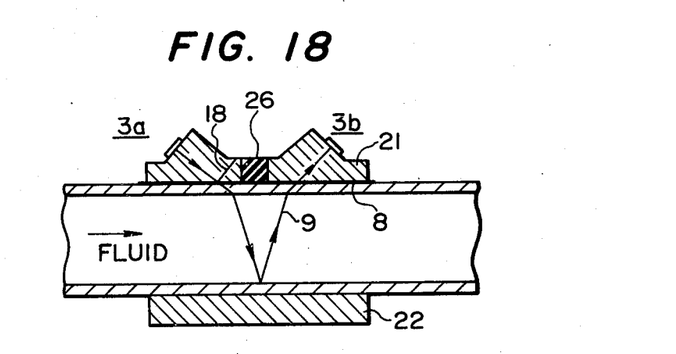
FIG. 18 is a sectional view showing a modification of the second embodiment of the device according to the invention corresponding to FIG. 8.

An ultrasonic metering device in which, as in the second embodiment, a pair of ultrasonic transducers 3a and 3b are located only on one side of a pipe 1, is liable to suffer from a disadvantage that one of the ultrasonic transducers may receive an unwanted pulse signal or an unwanted reflection wave 18 (FIGS. 8 and 18) which is generated when the output ultrasonic pulse signal of the other ultrasonic transducer propagates outside the predetermined propagation path and is reflected from the inner wall of the pipe. In order to eliminate this problem, a gap 25 (FIGS. 5 and 8) is provided between the two transducers 3a and 3b so that the wave is not reflected again. Alternatively, as shown in FIG. 18, a sound absorbing material 26 may be inserted in the gap 25 so as to absorb the unwanted reflection wave 18.

A technique for improving the mounting accuracy in the third and fourth examples will now be described.

The throughholes 11 formed in the mounting members 2a and 2b in the third embodiment or the throughholes 11a and 11b formed in the mounting member 2a in the fourth embodiment serve as guides when the transmitter 3a and the receiver 3b are inserted thereinto. The throughholes may be machined with the required accuracy. Thus, the accuracy of the mounting positions of the transmitter 3a and the receiver 3b depends on the mounting accuracy of the mounting members 2a and 2b in the third embodiment or the mounting member 2a in the fourth embodiment.

Figures 11, 12:
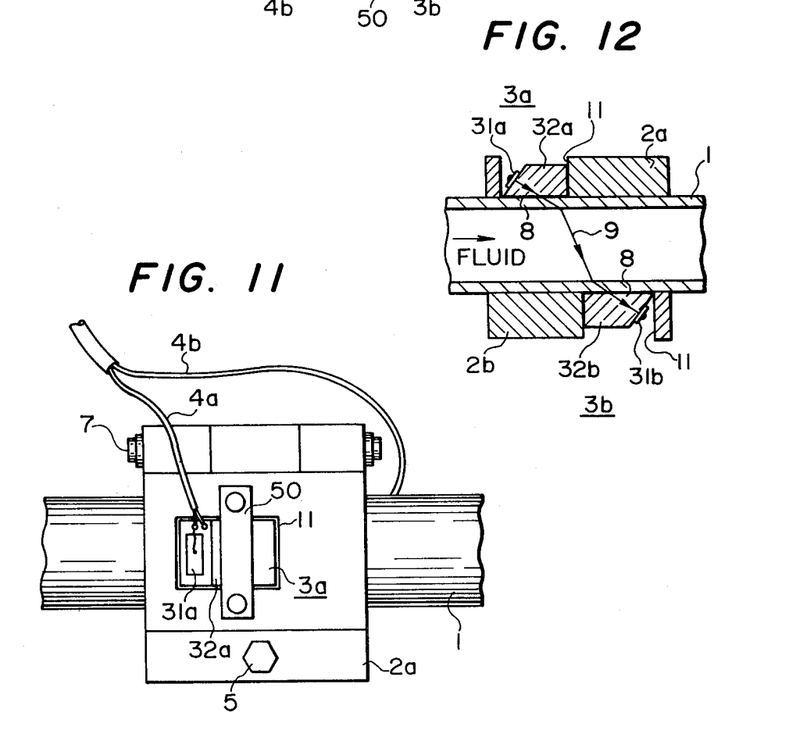
FIG. 11 is a plan view of the device as viewed in the direction of an arrow III in FIG. 9.
FIG. 12 is a sectional view of the device taken along a line IV—IV in FIG. 9.

The positioning of the mounting members to provide the required mounting accuracy separately in the axial direction of the pipe and in the cross section of the same will now be considered. With respect to the axial direction of the pipe, in the third embodiment, the first end portions of the mounting members 2a and 2b are coupled to each other with the pin. Therefore, the relative distance between the transmitter 3a and the receiver 3b can be determined by machining the throughholes 11 in the mounting members 2a and 2b so that the position of the throughholes 11 correspond to the diameter of the pipe (FIG. 12). In the fourth embodiment, the relative distance L between the transmitter 3a and the receiver 3b can be set by machining the throughholes 11a and 11b in the mounting member 2a so that the positions of the throughholes 11a and 11b correspond to the diameter of the pipe (FIG. 16).

With respect to the cross section of the pipe, the transmitter 3a and the receiver 3b can be mounted on a straight line passing through the center O of the pipe using the positioning flat surfaces 12 which are provided in the inner walls of the mounting members 2a and 2b.

Figure 19:
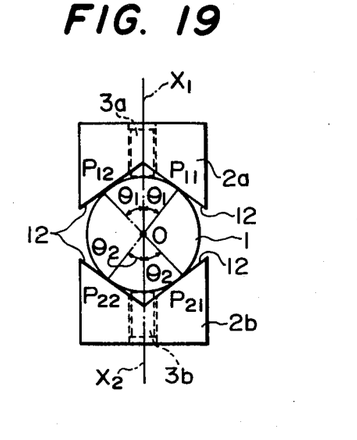
FIG. 19 is an explanatory diagram for a description of the principle of positioning ultrasonic transducers in a modification of mounting members in accordance with the invention.

This positioning arrangement will be described with reference to FIG. 19 in greater detail. The mounting members 2a and 2b have V-shaped grooves which are symmetrical with the ultrasonic propagation path center lines $X_1$ and $X_2$ of the transmitter 3a and the receiver 3b, respectively. The surfaces of the V-shaped grooves, which are the aforementioned positioning flat surfaces 12, are brought into contact with the pipe 1 at contact points $P_{11}$ and $P_{12}$, and $P_{21}$ and $P_{22}$. From elementary geometry, the center lines $X_1$ and $X_2$ must pass through the central axis O of the pipe 1. In order that the two center lines $X_1$ and $X_2$ fall along a single line as depicted in FIG. 19, it is necessary that the mounting members 2a and 2b be parallel to each other. Designing the mounting members to conform to the diameter of the pipe is readily achievable. As is clear from the above description, the relative positions of the transmitter 3a and the receiver 3b can be preset when the metering device is manufactured. Thus, the metering device can be satisfactorily mounted on a pipe 1 at a working site merely by tightening the tightening the bolt 5 and the nut 6. Thus, it can be appreciated that the ultrasonic metering device of the invention can be readily mounted on a pipe 1.

Similarly as in the second embodiment, in the fourth embodiment, in order to prevent the direct incidence of the unwanted reflection wave 18 to the receiver 3b, an ultrasonic wave absorbing material 26 is inserted between the transmitter 3a and the receiver 3b as shown in FIG. 16.

Figure 20:
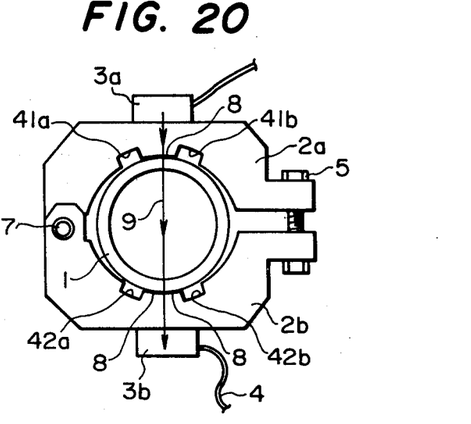
FIG. 20 is an end view showing another example of contact surfaces which are formed in the inner walls of the mounting members in the first embodiment of the device of the invention.

FIG. 20 shows another example of the contact surfaces 10 of the mounting members 2a and 2b. Grooves 41a and 41b and grooves 42a and 42b are formed in parts of the circular sections shown in FIG. 17(A) or FIG. 17(B) in such a manner that they are positioned symmetrically on either side of the ultrasonic propagated path 9. Accordingly, in this example, the acoustic coupling regions of the mounting members 2a and 2b and the pipe 1 are limited so as to prevent the propagation of the ultrasonic wave in unwanted directions.

It is clear that the provision of the grooves 42a and 42b is unnecessary for a reflection type ultrasonic metering device such as the second embodiment.

Figure 21A:
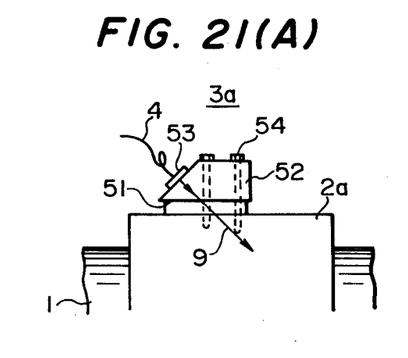
FIGS. 21(A) and 21(B) are a side view and an end view of another example of a structure which is adapted to mount an ultrasonic transducer on the mounting member.
Figure 21B:
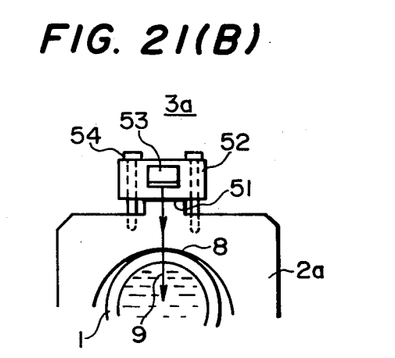

FIGS. 21(A) and 21(B) show another example of the mounting structure of the transmitter 3a or the receiver 3b. The mounting structure of the receiver 3b is not shown because it is similar to the mounting structure of the transmitter. Here, the transmitter 3a, composed of a wedge 52 and a conversion element 53, is not integral with the mounting member 2a. However, the transmitter 3a is structurally integral with the mounting member because they are acoustically coupled to each other by bolts 54 with an acoustic coupling medium 51 interposed therebetween.

Figure 22:
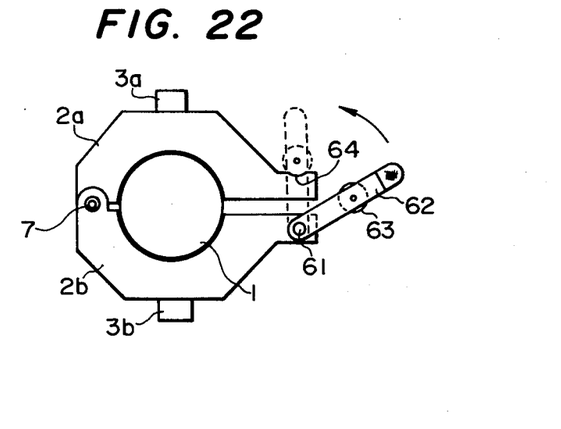
FIG. 22 is an end view showing another example of a tightening member which is employed in the invention.
Figure 23A:
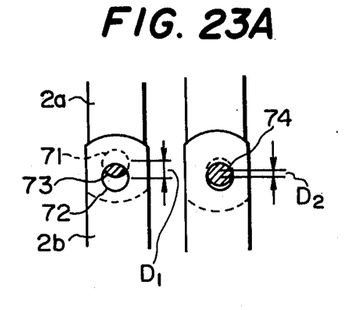
FIGS. 23(A), 23(B) and 24(A), 24(B) are end views showing two different examples of a mechanism for adjusting the relative position of the ultrasonic transducers in a section perpendicular to the axis of a pipe.
Figure 23B:
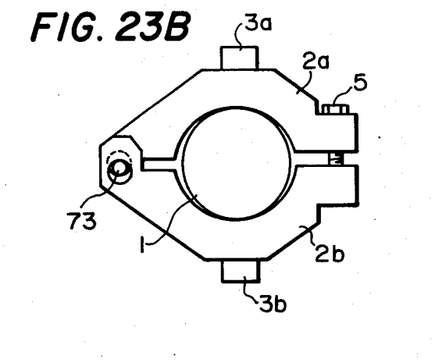
Figure 24A:
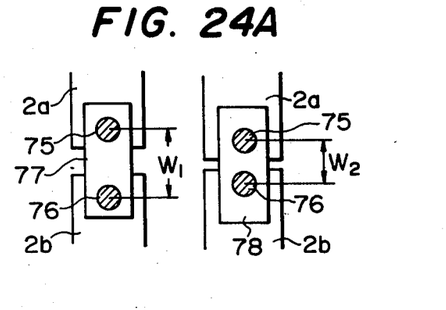
Figure 24B:
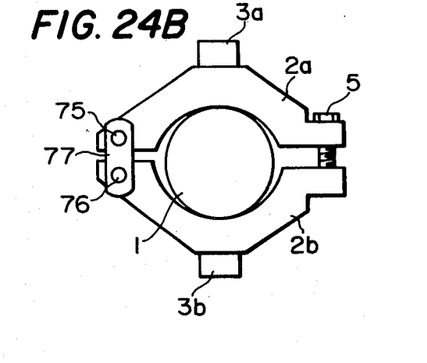

FIG. 22 shows another example of the securing structure of the mounting members 2a and 2b which clamp the pipe 1 and are fixedly secured to the latter. An arm 62 is pivotally connected through a pin 61 to the mounting member 2b. The arm 62 has a roller 63 at a predetermined position. The other mounting member 2a has a groove 64. The roller 63 is fitted in the groove 64 by turning the arm 62 so that the mounting members 2a and 2b are strongly tightened together and the entire ultrasonic metering device is fixedly secured to the pipe.

FIGS. 23(A), 23(B) and 24(A), 24(B) show examples of mounting members which can be mounted on pipes of different diameter. Each of these mounting members has an adjusting mechanism in a section perpendicular to the axis of a pipe. In the example shown in FIGS. 23(A), and 23(B) the diameter of a pin 73 inserted into the hinge pin holes 71 and 72 of the mounting members is changed so that the mounting members are adjusted to pipes 1 of different diameter in the range of the diameters of the hinge pin holes 71 and 72. In the example shown in FIGS. 24(A) and 24(B) the mounting members 2a and 2b are provided with hinge pins 75 and 76 and hinge pin holes, respectively, and the mounting members 2a and 2b are coupled to each other through spacers 77 and 78 which are selectively used. The distance $W_1$ between the pin holes of the spacer 77 is made different from that $W_2$ between the pin holes of the spacer 78 so that the mounting members can be adjusted for pipes of different diameter. Thus, the transmitter 3a and the receiver 3b can be correctly mounted on pipes of different diameter. Specifically, when mounted, they face forwards forming an angle of 180°.

In the above description, reference characters 3a and 3b designate the transmitter and the receiver, respectively, although the opposite designation may be appropriate depending on the measurement period.

The above description concerning FIGS. 23(A), 23(B) and 24(A), 24(B) is applicable to the second embodiment as well, i.e. the reflection type ultrasonic metering device. In this case, in each of FIGS. 23(A), 23(B) and 24(A), 24(B) the receiver 3b does not appear because it is behind the transmitter 3a.

Figure 25:
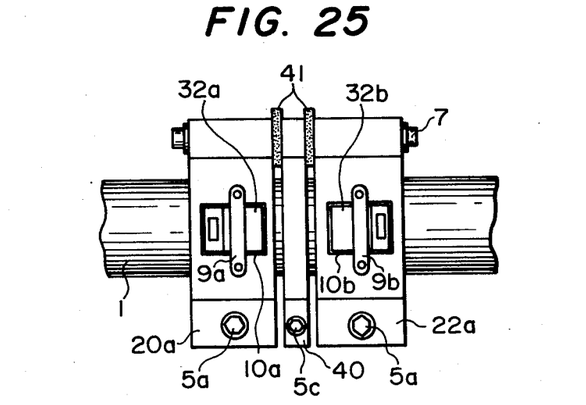
FIGS. 25 and 26 are a plan view and a sectional view showing two different examples of a mechanism for adjusting the distance between the ultrasonic transducers in the axial direction of the pipe, respectively.
Figure 26:
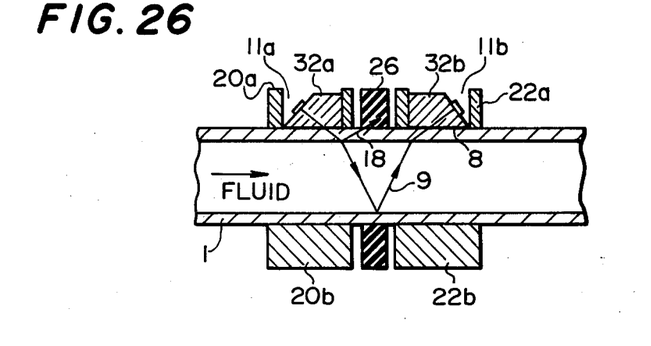

Another example of the mounting members applicable to pipes of different diameter is shown in FIGS. 25 and 26. If a pipe has a different diameter, wall thickness or material than the mounting members were initially designed for, the relative distance L (FIG. 16) between the transmitter 3a and the receiver 3b will be different even if the wedge's inclination angle is the same. Accordingly, in this case, it is necessary to adjust the relative distance L according to the diameter of the pipe, etc. The example shown in FIGS. 25 and 26 is provided to satisfy this requirement. The transmitter 3a is inserted into a throughhole 11a formed in a mounting member 20a while the receiver 3b is inserted into a throughhole 11b formed in a mounting member 22a. The mounting member 20a is hingedly coupled to a mounting member 20b with a pin 7. The mounting member 22a is also hingedly coupled to a mounting member 22b with the same pin 7. The mounting members 20a and 20b and the mounting members 22a and 22b and tightened together with tightening bolts 5a and nuts 5b. The inner walls of the mounting members 20a and 20b and the mounting members 22a and 22b are formed similar to those of the mounting members 2a and 2b shown in FIGS. 13 through 16. The distance between the mounting members 20a and 20b holding the transmitter 3a and the mounting members 22a and 22b holding the receiver 3b can be changed by sliding the pin 7 in the axial direction of the pipe. The distance thus set can be readily maintained unchanged by the insertion of spacers 41. An ultrasonic wave absorbing material 26' is interposed between the transmitter 3a and 3b so as to prevent the reception of the unwanted reflection waves, which do not go through the fluid, in the wall of the pipe. The sound absorbing material 26' is fixedly secured to the pipe 1 with a tightening bolt 5c.

Figure 27:
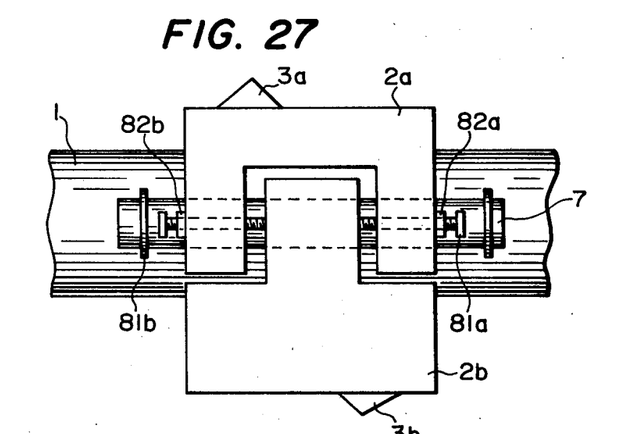
FIGS. 27 and 28 are side views showing two other examples of a mechanism for adjusting the distance between the ultrasonic transducers in the axial direction of the pipe.
Figure 28:
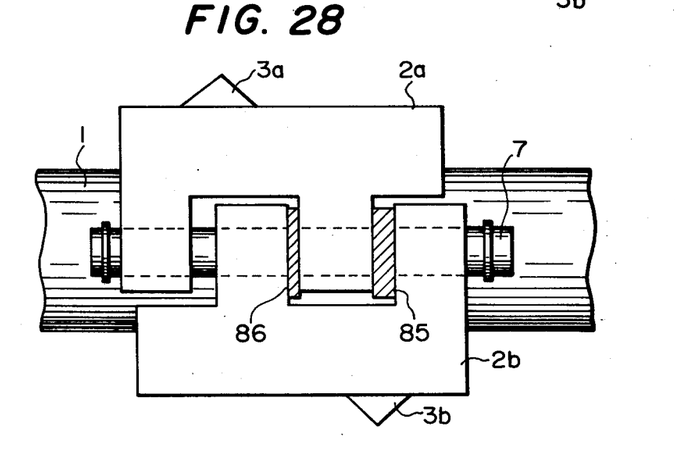

FIGS. 27 and 28 show, in the axial direction of a pipe, examples of an adjustment mechanism which is applicable to the first and third embodiments of the ultrasonic metering device according to the invention. These mechanisms are provided to compensate for variations in the relative distance between the transmitter and the receiver in the axial direction of a pipe caused when the device is used with a pipe of different diameter. In these examples, in order to change the relative distance between the transmitter 3a and the receiver 3b, the end portions of two mounting members 2a and 2b which are hingedly coupled to each other with a pin 7, unlike those shown in FIG. 3 or 11, are formed with interleaved portions. In order to fixedly secure the mounting members after the relative position has been set up, in the example shown in FIG. 27, the mounting members are positioned with adjusting screws 81a and 81b while in the example shown in FIG. 28, they are positioned with spacers 85 and 86. More specifically, in the case of FIG. 27, the adjusting screws 81a and 81b are screwed into threaded holes formed in the mounting member 2a until they abut against the other mounting member 2b. Thereafter, the screws are secured with lock nuts 82a and 82b. In the case of FIG. 28, two spacers 85 and 86 whose thickness corresponds to the set position are inserted in the spaces between the interleaved end portions of the mounting members 2a and 2b thereby to fix the positions of the mounting members.

With the above-described adjustment mechanism, the same mounting members can be mounted on pipes of different diameter. The adjustment mechanism is applicable to the case where the relative distance between the transmitter and the receiver is varied not only when the device is used with a different diameter pipe but also when the device is used with a pipe having a different wall thickness or it carries a different fluid.

In the above description, the ultrasonic transducers 3a and 3b are described as serving as an ultrasonic transmitter and an ultrasonic receiver, respectively. However, in a different measurement mode they may be interchanged.

Figure 29:
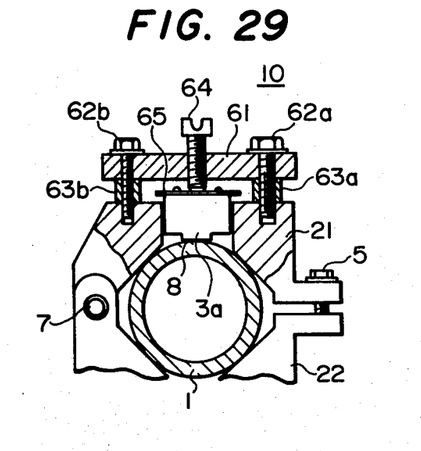
FIG. 29 is a sectional view showing another example of an ultrasonic transducer depressing member which is employed in the invention.

FIG. 29 shows another example of the depressing member 10 for the ultrasonic transducer or the ultrasonic transmitter in FIG. 29 in the third embodiment. The ultrasonic transmitter 3a is depressed against the pipe 1 by a depressing bolt with a depressing plate 61 acting as a force reacting base. The depressing plate 61 is fixedly secured to the mounting member 21 through spacers 63a and 63b with bolts 62a and 62b. With this construction of the depressing member 10, the transducer (3a or 3b) can be depressed against the pipe with a great force. Therefore, in this case, a metal foil may be employed as the acoustic coupling medium 8 to acoustically couple the transducer to the pipe. The transmitter 3a may be provided with a leaf spring 65 as the case may be. In this case, first the transmitter 3a is set spaced from the pipe by the elastic force of the leaf spring 65 and then the transmitter 3a is brought into contact with the pipe by operating the depressing bolt 64. In this case, the acoustic coupling medium 8 held by the ultrasonic transducer can be protected from being contaminated, peeled off or damaged before the transducer is completely set.

Figure 30:
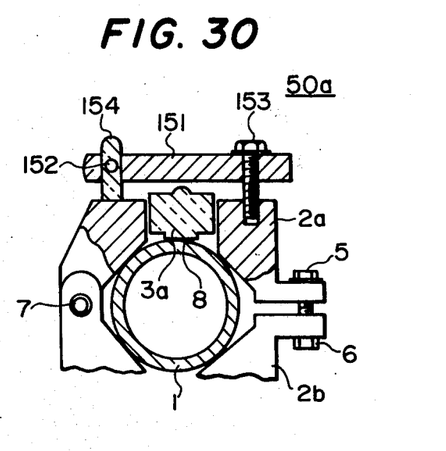
FIG. 30 is a sectional view showing a further example of the ultrasonic transducer depressing member.

FIG. 30 shows a further example of the depressing member for the ultrasonic transducer, or the transmitter 3a in this case, in the fourth embodiment. The transmitter 3a is depressed against the pipe 1 by tightening a depressing plate 151 with a depressing bolt 153. The depressing plate 151 is pivotally secured to a fixing rod 154 at one end with a pin 152. With the depressing member 50a constructed as described above, the transducer 3a or 3b can be depressed against the pipe with a great force. Accordingly, a metal foil may be employed as the acoustic coupling medium 8 so that the transducer is acoustically coupled to the pipe by a depression force. Therefore, in this case, a transmitter and receiver which can withstand a high temperature of higher than 100° C. can be used. The transmitter 3a may be provided with a leaf spring (not shown) as the case may be. In this case, the transmitter is held apart from the pipe 1 by the elastic force of the leaf spring and then the transmitter is brought into contact with the pipe 1 by operating the depressing bolt 153. Accordingly, similarly as in the above-described case, the acoustic coupling medium 8 held by the transmitter can be protected from being contaminated, peeled off or damaged before the transmitter is completely set.

Figure 31:
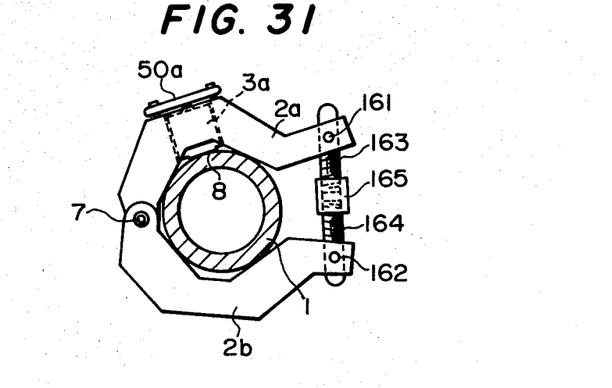
FIG. 31 is an end view showing another example of the tightening member which is employed in the invention.

FIG. 31 shows a modification of the above-described tightening bolt 5. The mounting members 2a and 2b have pins 161 and 162 as shown in FIG. 31. A right-hand thread screw 163 and a left-hand thread screw 164 are coupled to the pins 161 and 162, respectively. The other end portions of the screws 163 and 164 are coupled to a turnbuckle 165. Accordingly, the pins 161 and 162 can be set closer to each other by turning the turnbuckle 165 thereby to fixedly secure the mounting members to the pipe 1.

Figure 32:
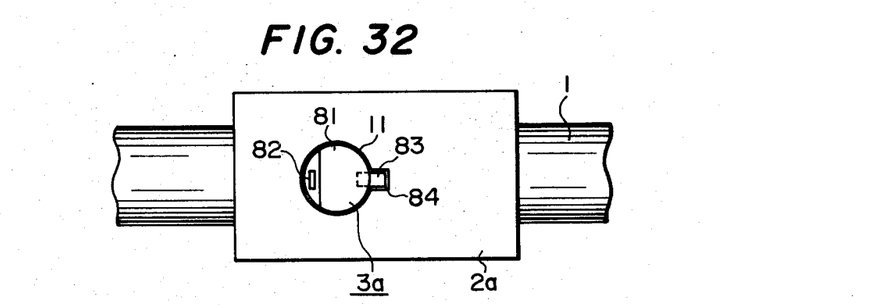
FIG. 32 is a side view showing another example of a throughhole for receiving the ultrasonic transducer which is employed in the invention.

FIG. 32 shows a modified configuration of the throughhole 11 of the mounting member 2a in which the ultrasonic transducer, for instance the transmitter 3a, is inserted. In this case, the transmitter 3a is cylindrically shaped and a pin 83 protrudes from the side of the cylindrical transmitter 3a. Since the throughhole 11 should serve as a guide when the transmitter 3a is positioned on the mounting member, the configuration of the throughhole 11 is modified to accommodate the cylindrical transmitter and the throughhole 11 is provided with a notch 84 for receiving the pin 83 of the transmitter. The direction of the conversion element 82 is fixed by inserting the pin 83 into the notch 84. With the throughhole 11 is shaped as described above, proper machining can be readily achieved to improve the fitting accuracy.

Various modifications have been described with respect to the mounting structure on the side of the ultrasonic transmitter. However, the same mounting structure is of course applicable to the side of the ultrasonic receiver.

Furthermore, it should be noted again that in the above description, the ultrasonic transducers 3a and 3b serve as an ultrasonic transmitter and an ultrasonic receiver, respectively, although this designation may be reversed for a different measurement mode.

The invention described above provides the following effects and advantages:

(1) Since the transducers can be positioned with a high accuracy according to the invention, the measurement of flow rate, etc. can be achieved accurately. In other words, as the mounting members are formed as an integral unit using the coupling pin, the relative positions between the transmitter and the receiver can be accurately set when the metering device is manufactured.

(2) The metering device can be easily and readily mounted on a pipe. Therefore, even an unskilled worker can perform the mounting operation. Heretofore, only a specially skilled person could be used to mount the device. However, according to the invention the mounting position is set during the manufacturing process and accordingly no intricate adjustment is required in mounting the metering device on a pipe. That is, the metering device can be mounted on a pipe accurately merely by operating the depressing member and the tightening members. Thus, even an unskilled person can perform the required task.

(3) It has been confirmed through experiments that the metering device can be mounted on a pipe within a short period of tlime of the order of one minute. This is due to the fact that the structure of the ultrasonic metering device of the invention is such that the positioning operation which heretofore required much time is eliminated according to the invention and no adjustment is required in mounting the device on a pipe.

(4) As the tightening mechanism is employed, a depression system in which a metal foil as an acoustic coupling medium is interposed between a pipe and the ultrasonic transmitter or the ultrasonic receiver can be employed. Accordingly, the ultrasonic metering device can be used to measure a fluid at a high temperature. A conventional acoustic coupling medium such as grease or resin cannot withstand a temperature higher than about 250° C. However, if the ultrasonic transmitter and receiver are depressed against a pipe through a metal foil as an acoustic coupling medium by the depressing member and the mounting mechansim is in its entirety resistive against heat, then the ultrasonic metering device can be satisfactorily used to measure a fluid at a high temperature.

(5) According to the invention, a gap 25 (FIG. 8) is provided between the transmitter 3a and the receiver 3b on the mounting member 2a and sound absorbing material 26' is filled in the gap 25 so that unwanted reflection waves can be absorbed which improves the S/N ratio in the measurement.

What is claimed is:

1. An ultrasonic metering device in which two ultrasonic transducers are arranged adjacent a pipe in which a fluid flows in such a manner that one of said ultrasonic transducers transmits ultrasonic waves towards the fluid while the other ultrasonic transducer receives ultrasonic waves which have passed through the fluid, which comprises:

a first ultrasonic transducer having a first ultrasonic conversion element and a first wedge holding said first ultrasonic conversion element;

a second ultrasonic transducer having a second ultrasonic conversion element and a second wedge holding said second ultrasonic conversion element;

a pair of mounting members on which said first and second transducers are positioned said mounting members being adapted to be mounted on a pipe in which a fluid to be measured flows in such a manner that said mounting members clamp said pipe with first end portions of said mounting members hingedly coupled to each other; and tightening means for coupling opposite free end portions of said mounting members which have clamped said pipe to fixedly secure said mounting members to said pipe;

wherein, in a projection taken perpendicular to the longitudinal axis of the pipe, the inner walls of said pair of mounting members have contact surfaces which are symmetrical with respect to a plane including an ultrasonic propagation path and are in point contact with the outer wall of said pipe and said ultrasonic propagation path passes through the center of said pipe; and in a projection taken parallel to the longitudinal axis of the pipe, the inner walls of said pair of mounting member have contact surfaces which are in line contact with the outer wall of said pipe, the central axes of said first and second ultrasonic transducers are inclined with respect to a line perpendicular to said longitudinal axis of said pipe, and said ultrasonic propagation path is inclined with respect to said longitudinal axis of said pipe.

2. The device as claimed in claim 1 in which said first end portions of said pair of mounting members are hingedly coupled to each other with a pin.

3. The device as claimed in claim 1 in which said first end portions of said pair of mounting members are coupled with a spacer for varying the distance between pins provided respectively on said pair of mounting members according to the diameter of a pipe on which said device is to be mounted.

4. The device as claimed in claim 1 in which said first end portions of said pair of mounting members which are hingedly coupled to one another are spaced from each other to such an extent as to make it possible to adjust the relative distance between said mounting members in the longitudinal direction of said pipe.

5. The device as claimed in any of claims 2–4 and 1 in which said tightening means for securing said pair of mounting members to said pipe comprises a tightening bolt.

6. The device as claimed in any of claims 2–4 and 1 in which said tightening means for securing said pair of mounting members to said pipe comprises an arm having a roller which is hingedly coupled to one of said mounting members, and wherein a groove is cut in the other mounting member with which said roller is engaged.

7. The device as claimed in any of claims 1–4 in which said first wedge and said second wedge are integrally formed with said pair of mounting members.

8. The device as claimed in claim 1 in which said first and second ultrasonic transducers are movably positioned on said mounting members and are depressed against said pipe by depressing means fixed to said mounting members.

9. An ultrasonic metering device in which two ultrasonic transducers are arranged adjacent a pipe in which a fluid flows in such a manner that one of said ultrasonic transducers transmits ultrasonic waves towards the fluid while the other ultrasonic transducer receives ultrasonic waves which have passed through the fluid, which comprises:

a first ultrasonic transducer having a first ultrasonic conversion element and a first wedge holding said first ultrasonic conversion element;

a second ultrasonic transducer having a second ultrasonic conversion element and a second wedge holding said second ultrasonic conversion element;

a pair of mounting members on which said first and second transducers are fixedly provided, said mounting members being adapted to be mounted on a pipe in which a fluid to be measured flows in such a manner that said mounting members clamp said pipe with first end portions of said mounting members hingedly coupled to each other; and tightening means for coupling opposite free end portions of said mounting members which have clamped said pipe to fixedly secure said mounting members to said pipe;

wherein said first and second ultrasonic transducers are positioned on one of said mounting members spaced apart from one another in such a manner that one of said ultrasonic transducers receives ultrasonic waves which have been transmitted by the other ultrasonic transducer, passed through said fluid to be measured and reflected by the inner wall of said pipe; and in a projection taken perpendicular to the longitudinal axis of the pipe, the inner walls of at least said mounting member on which said first and second altrasonic transducers are positioned have contact surfaces which are symmetrical with respect to a plane including an ultrasonic propagation path and are in point contact with the outer wall of said pipe and said ultrasonic propagation path passes through the center of said pipe; and in a projection taken parallel to the longitudinal axis of the pipe, the inner walls of said pair of mounting members have contact surfaces which are in line contact with the outer wall of the pipe, the central axes of said first and second ultrasonic transducers are inclined by equal and opposite angles with respect to a line perpendicular to said longitudinal axis of said pipe, and said ultrasonic propagation path has two components inclined by equal and opposite angles with respect to a line perpendicular to said longitudinal axis of said pipe passing through a reflection point of said ultrasonic propagation path.

10. The device as claimed in claim 9 in which a gap is provided between said first and second ultrasonic transducers on said one mounting member.

11. The device as claimed in claim 10 in which said gap is filled with an ultrasonic wave absorbing material.

12. An ultrasonic metering device in which two ultrasonic transducers are arranged adjacent a pipe in which a fluid flows in such a manner that one of said ultrasonic transducers transmits ultrasonic waves towards the fluid while the other ultrasonic transducer receives ultrasonic waves which have passed through the fluid, which comprises:

a first ultrasonic transducer having a first ultrasonic conversion element and a first wedge holding said first ultrasonic conversion element;

a second ultrasonic transducer having a second ultrasonic conversion element and a second wedge holding said second ultrasonic conversion element;

a pair of mounting members on which said first and second transducers are positioned, said mounting members being adapted to be mounted on a pipe in which a fluid to be measured flows in such a manner that said mounting members clamp said pipe with first end portions of said mounting members hingedly coupled to each other; and tightening means for coupling opposite free end portions of said mounting members which have clamped said pipe to fixedly secure said mounting members to said pipe;

wherein said pair of mounting members are provided with throughholes for receiving said first and second ultrasonic transducers, respectively, and a pair of depressing means for depressing said first and second ultrasonic transducers against said pipe after said first and second ultrasonic transducers are inserted in said throughholes, the inner walls of said pair of mounting members having V-shaped groove structures each of which is symmetrical with respect to a plane including an ultrasonic propagation path so that said first and second ultrasonic transducers face the center of said pipe and an ultrasonic wave passes through the center of said pipe in a section perpendicular to the axis of said pipe, and that the propagation paths of ultrasonic waves from said first and second ultrasonic transducers are on a single line passing through the center of said pipe.

13. The device as claimed in claim 12 in which said first end portions of said pair of mounting members are hingedly coupled to each other with a pin.

14. The device as claimed in claim 12 in which said first end portions of said pair of mounting members are coupled to each other with a spacer for varying the distance between a pair of pins provided on said pair of mounting members according to the diameter of a pipe on which said device is to be mounted.

15. The device as claimed in claim 12 in which said first end portions of said pair of mounting members which are hingedly coupled are spaced from each other to such an extent as to make it possible to adjust the relative distance between said mounting members in the longitudinal direction of said pipe.

16. The device as claimed in any of claims 13-15 and 12 in which said tightening means for securing said pair of mounting members to said pipe comprises a tightening bolt.

17. The device as claimed in any of claims 13-15 and 12 in which said tightening means for securing said pair of mounting members to said pipe comprises an arm having a roller which is hingedly coupled to one of said mounting members, and wherein a groove cut is in the other mounting member with which said roller is engaged.

18. The device as claimed in any of claims 13-15 and 12 in which the configuration in section of each of said throughholes formed in said mounting members and of each of said first and second ultrasonic transducers which are inserted in said throughholes is polygonal.

19. The device as claimed in any of claims 13-15 and 12 in which the configuration in section of each of said throughholes formed in said mounting members and of each of said first and second ultrasonic transducers which are inserted in said throughholes is circular, each of said first and second ultrasonic transducers has a pin protruding sidewardly therefrom, and each of said throughholes has a notch engageable with said pin to fixedly position said first and second ultrasonic transducers in said throughholes.

20. An ultrasonic metering device in which two ultrasonic transducers are arranged adjacent a pipe in which a fluid flows in such a manner that one of said ultrasonic transducers transmits ultrasonic waves towards the fluid while the other ultrasonic transducer receives ultrasonic waves which have passed through the fluid, which comprises:

a first ultrasonic transducer having a first ultrasonic conversion element and a first wedge holding said first ultrasonic conversion element;

a second ultrasonic transducer having a second ultrasonic conversion element and a second wedge holding said second ultrasonic conversion element;

a pair of mounting members on which said first and second transducers are positioned, said mounting members being adapted to be mounted on a pipe in which a fluid to be measured flows in such a manner that said mounting members clamp said pipe with first end portions of said mounting members hingedly coupled to each other; and tightening means for coupling opposite free end/portions of said mounting members which have clamped said pipe to fixedly secure said mounting members to said pipe;

wherein one of said mounting members has two throughholes formed therein in which said first and second ultrasonic transducers are inserted in such a manner that one of said ultrasonic transducers receives ultrasonic waves which have been transmitted by the other ultrasonic transducer, passed through said fluid to be measured and reflected by the inner wall of said pipe, said one mounting member having a pair of depressing means for depressing said first and second ultrasonic transducers against said pipe after said first and second ultrasonic transducers are inserted in said throughholes formed in said one mounting member, the inner wall at least of said one mounting member having a V-shaped groove structure which is symmetrical with respect to a plane including an ultrasonic propagation path so that said first and second ultrasonic transducers face the center of said pipe and an ultrasonic wave passes through the center of said pipe in a section perpendicular to the axis of said pipe, and that with respect to a given pipe diameter, the propagation paths of ultrasonic waves from said first and second ultrasonic transducers are in a plane passing through the center of said pipe.

21. The device as claimed in claim 20 in which an ultrasonic wave absorbing material is provided between said first and second ultrasonic transducers thereby to prevent direct application of unwanted reflection waves from the wall of said pipe which have not passed through said fluid to one of said first and second ultrasonic transducers which is adapted to receive ultrasonic waves.

22. An ultrasonic metering device in which two ultrasonic transducers are arranged on either side of a pipe in which a fluid to be measured flows in such a manner that one of said ultrasonic transducer transmits ultrasonic waves towards said fluid while the other ultrasonic transducer receives the ultrasonic waves which, after passing through said fluid, are reflected by the inner wall of said pipe, which comprises:

a first ultrasonic transducer having a first ultrasonic conversion element and a first wedge for holding said first ultrasonic conversion element;

a second ultrasonic transducer having a second ultrasonic conversion element and a second wedge for holding said second ultrasonic conversion element;

a first mounting unit having first and second mounting members the first end portions of which are hingedly coupled to each other with a pin, said first mounting member having a throughhole for receiving said first ultrasonic transducer, said first mounting unit being mounted on said pipe in such a manner as to clamp said pipe;

a second mounting unit having third and fourth mounting members the first end portions of which are hingedly coupled to each other with said pin, said third mounting member having a throughhole for receiving said second ultrasonic transducer, said second mounting unit being mounted on said pipe in such a manner as to clamp said pipe;

first depressing means for depressing said first ultrasonic transducer against said pipe when said first ultrasonic transducer is inserted in said throughhole in said first mounting member;

second depressing means for depressing said second ultrasonic transducer against said pipe when said second ultrasonic transducer is inserted in said throughhole in said third mounting member;

first tightening means for coupling the opposite free end portions of said first and second mounting members of said first mounting unit which has been mounted on said pipe in such a manner as to clamp said pipe to fixedly secure said first mounting unit to said pipe;

second tightening means for coupling the opposite free end portions of said thrid and fourth mounting members of said second mounting unit which has been mounted on said pipe in such a manner as to clamp said pipe to fixedly secure said second mounting unit to said pipe; and a spacer provided between said first and second mounting unit to maintain a predetermined distance between said first and second ultrasonic transducers;

the inner wall of at least each of said mounting members on which said ultrasonic transducers are provided having a V-shaped groove structure which is symmetrical with respect to a plane including an ultrasonic propagation path so that said first and second ultrasonic transducers face the center of said pipe and an ultrasonic wave passes through the center of said pipe, and that for a predetermined pipe diameter the propagation paths of ultrasonic waves from said first and second ultrasonic transducers are in a plane passing through the center of said pipe.

23. The device as claimed in claim 22 in which an ultrasonic wave absorbing material is provided between said first and second mounting units to prevent direct application of unwanted reflection waves from the wall of said pipe which have not passed through said fluid to one of said ultrasonic transducers which is adapted to receive ultrasonic waves.

* * * * *